(12) United States Patent
Spalding et al.

(10) Patent No.: US 10,186,029 B2
(45) Date of Patent: Jan. 22, 2019

(54) OBJECT CHARACTERIZATION

(71) Applicant: Wisconsin Alumni Research Foundation, Madison, WI (US)

(72) Inventors: Edgar P. Spalding, Middleton, WI (US); Nathan D. Miller, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 14/865,828

(22) Filed: Sep. 25, 2015

(65) Prior Publication Data

US 2016/0093037 A1 Mar. 31, 2016

Related U.S. Application Data

(60) Provisional application No. 62/055,878, filed on Sep. 26, 2014.

(51) Int. Cl.
*G06K 9/00* (2006.01)
*G06T 7/00* (2017.01)
*G06T 7/62* (2017.01)

(52) U.S. Cl.
CPC ............. *G06T 7/0012* (2013.01); *G06T 7/62* (2017.01); *G06T 2207/10024* (2013.01);
(Continued)

(58) Field of Classification Search
None
See application file for complete search history.

(56) References Cited

U.S. PATENT DOCUMENTS

| 5,835,206 A | 11/1998 | Tragesser |
| 6,212,824 B1 | 4/2001 | Orr et al. |
(Continued)

FOREIGN PATENT DOCUMENTS

| CN | 101199269 A | 6/2008 |
| CN | 101658107 A | 3/2010 |
(Continued)

OTHER PUBLICATIONS

EP 0974931 (english translation) Jul. 24, 1998 ;Ramana et al.*
(Continued)

*Primary Examiner* — Nancy Bitar
(74) *Attorney, Agent, or Firm* — Crawford Maunu PLLC

(57) ABSTRACT

Various aspects of the present disclosure are directed to characterizing objects or other items, which as may be implemented in a machine-vision type approach. As may be implemented with one or more embodiments, some of which may involve a Fourier transform analysis, object regions (one or more objects) are identified in image data depicting several objects, and the size of each object-region is identified. Respective ratios of the size of each object-region to the size of each of the other object regions are determined, and object regions having a higher total number of ratios that round to one (relative to the other object regions) are identified. An expected (e.g., average) individual object size is determined based on the sizes of the identified object regions, and a total number of the objects in the image is determined based on the expected individual object size and the sizes of the object regions.

24 Claims, 5 Drawing Sheets

(52) U.S. Cl.
CPC ............... *G06T 2207/20056* (2013.01); *G06T 2207/30128* (2013.01); *G06T 2207/30242* (2013.01)

(56) References Cited

U.S. PATENT DOCUMENTS

| | | | |
|---|---|---|---|
| 6,567,537 | B1 | 5/2003 | Anderson |
| 6,646,264 | B1 | 11/2003 | Modiano et al. |
| 6,738,154 | B1* | 5/2004 | Venable .................. G06K 9/32 358/1.15 |
| 7,412,330 | B2 | 8/2008 | Spicer et al. |
| 8,031,910 | B2 | 10/2011 | Jones et al. |
| 8,073,235 | B2 | 12/2011 | Hausmann et al. |
| 8,488,865 | B2 | 7/2013 | Hausmann et al. |
| 8,670,594 | B2* | 3/2014 | Lejeune .................. A01G 1/00 241/7 |
| 8,854,469 | B2* | 10/2014 | Horbinger ............ G06T 7/2053 348/159 |
| 2006/0046264 | A1 | 3/2006 | Deppermann et al. |
| 2007/0186313 | A1 | 8/2007 | Lightner et al. |
| 2007/0229693 | A1* | 10/2007 | Kameyama ............... G06T 5/00 348/333.01 |
| 2009/0075325 | A1 | 3/2009 | Das Pradip et al. |
| 2010/0265354 | A1* | 10/2010 | Kameyama ............. H04N 19/17 348/222.1 |
| 2011/0135161 | A1 | 6/2011 | Koutsky et al. |
| 2011/0167721 | A1 | 7/2011 | Lejeune et al. |
| 2012/0087579 | A1* | 4/2012 | Guerzhoy ................. G06T 7/12 382/164 |
| 2012/0277117 | A1 | 11/2012 | Zayed et al. |
| 2013/0094717 | A1* | 4/2013 | Janni .................... G06K 9/2018 382/110 |
| 2013/0136312 | A1 | 5/2013 | Tseng et al. |
| 2013/0266191 | A1 | 10/2013 | Hausmann et al. |
| 2014/0023243 | A1* | 1/2014 | Nagaraj ............. G06K 9/00624 382/110 |
| 2014/0079297 | A1* | 3/2014 | Tadayon .................. G06K 9/00 382/118 |

FOREIGN PATENT DOCUMENTS

| | | |
|---|---|---|
| CN | 101663968 A | 3/2010 |
| CN | 101881726 A | 11/2010 |
| CN | 102360428 A | 2/2012 |
| CN | 102384767 A | 3/2012 |
| CN | 102425992 A | 4/2012 |
| CN | 102565061 A | 7/2012 |
| CN | 102592118 A | 7/2012 |
| CN | 102763573 A | 11/2012 |
| CN | 103026823 A | 4/2013 |
| CN | 103039154 A | 4/2013 |
| CN | 103093456 A | 5/2013 |
| CN | 103155744 A | 6/2013 |
| CN | 103190224 A | 7/2013 |
| CN | 103229614 A | 8/2013 |
| CN | 103355026 A | 10/2013 |
| CN | 103544698 A | 1/2014 |
| EP | 1154370 A2 | 11/2001 |
| WO | 2001009711 A2 | 2/2001 |
| WO | 2004068934 A2 | 8/2004 |
| WO | 2006029987 A1 | 3/2006 |
| WO | 2007044828 A2 | 4/2007 |
| WO | 2008150903 A1 | 12/2008 |
| WO | 2010132731 A1 | 11/2010 |
| WO | 2013001436 A1 | 1/2013 |
| WO | 2013012860 A1 | 1/2013 |
| WO | 2013055657 A1 | 4/2013 |
| WO | 2013101806 A1 | 7/2013 |

OTHER PUBLICATIONS

Otsu, N., "A Threshold Selection Method from Gray-Level Histograms," Systems, Man and Cybernetics, IEEE Transactions on 1979, 9:62-66.

\* cited by examiner

OBJECT CHARACTERIZATION

FEDERALLY-SPONSORED RESEARCH AND DEVELOPMENT

This invention was made with government support under 1031416 awarded by the National Science Foundation. The government has certain rights in the invention.

FIELD

Aspects of various embodiments are directed to characterizing objects, such as by characterizing a number of objects in an image.

BACKGROUND

Many approaches have been used for characterizing objects in images for a variety of implementations. For example, objects in images may be desirably counted or otherwise characterized without necessarily involving human interaction.

In some applications, it can be desirable to characterize a number, shape, size or other aspect of plants, as may be useful for agricultural implementations. For instance, it can be desirable to field test agricultural products for several growing cycles to determine the yield and stability of a desired phenotypic trait. This can be a very costly and time-consuming process, as accurately characterizing aspects of objects can be difficult and may require human intervention or otherwise be difficult to automate.

Accordingly, it can be challenging to characterize objects, such as to acquire extensive phenotypic data early in the development process of agricultural products, in order to maximize the ability to achieve successful field trials. These and other matters have presented challenges to object characterization, for a variety of applications.

SUMMARY

Various example embodiments are directed to methods, apparatuses (including computer-readable media), and their implementation, as may be applicable for characterizing objects.

Various embodiments are directed to addressing challenges to accurately identifying and characterizing objects in an image using a machine-vision type approach, as is particularly application to images of a multitude of objects that may include individual objects and groups of objects clustered together. According to one such embodiment, data from an image of a plurality of objects is processed for identifying object regions that represent objects or groups of touching or connected objects in the image, based on differences between the object regions of the image and a background of the image. The size (e.g., area or periphery) of each object-region is determined, and used to determine an average individual object size for the objects in the image as follows. For each object-region, respective ratios of the size of the object-region to the size of each of the other object regions is determined, and therefrom a total number of the ratios that round to one are determined (e.g., ratios greater than ½ and greater than 1½). A subset of the object regions having a highest total number of the ratios that round to one, relative to the other object regions, is identified and an expected (e.g., average) individual object size is determined based on the sizes of the object regions in the subset (e.g., an average of the sizes). A total number of the objects in the image is determined based on the determined individual object size and the sizes of the object regions.

Another embodiment is directed to a non-transitory computer-readable medium having instructions stored thereupon that, when executed by a computer processor, cause the computer processor to carry out the aforementioned method-based steps. Other embodiments are directed to an apparatus having an imaging device that captures an image of a plurality of objects as noted above, and a computer processor that carries out the above method-based steps using image data for the objects as captured by the imaging device.

Other embodiments are directed to characterizing ears of corn, such as by characterizing one or both of corn ovules (before kernels grow) and corn kernels. According to a particular embodiment, image data from an image of an ear of corn is processed, and a portion of the image data including the corn ear is identified relative to a portion of the image data corresponding to a background of the image. A Fourier transform is applied to the gradient (e.g., a first derivative of image pixel values with respect to distance along the ear of corn) of the portion of the image data including at least some of the ear of corn, and transformed image data is provided therefrom. A frequency of peaks in the transformed image data is determined and used to estimate a length of each ovule or kernel. In some implementations, a rectangular window having a size that is less than the ear of corn is subjected to a Fourier transform, and that window is slid around the ear image. The average of the major frequency determined in each tile is taken as the kernel length. A frequency of peaks in the transformed image data is determined and a length of each kernel or ovule in the ear of corn is estimated based on the determined peak frequency. In various embodiments, the steps of processing, applying, determining and estimating are carried out for a plurality of ears of corn from a common batch, in which some of the ears are analyzed prior to kernel growth and others are analyzed after kernel growth, with the analysis used to determine yield.

In some embodiments, the image data is thresholded and used to identify the portion of the image data including the corn ear. The image is separated data into color channels and the Fourier transform is calculated of the gradient of one of the color channels along an axial length of the ear. Positive and negative values of the gradient of the one of the color channels is decomposed with a sliding window Fourier transform, a frequency of a peak amplitude for each sliding widow is determined and an average peak frequency is determined across sliding windows for both the positive and negative parts of the gradient. A cosine wave having the determined average peak frequency is plotted along the length of the ear, and the average ovule length or kernel length is estimated based upon a period T of the cosine wave.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
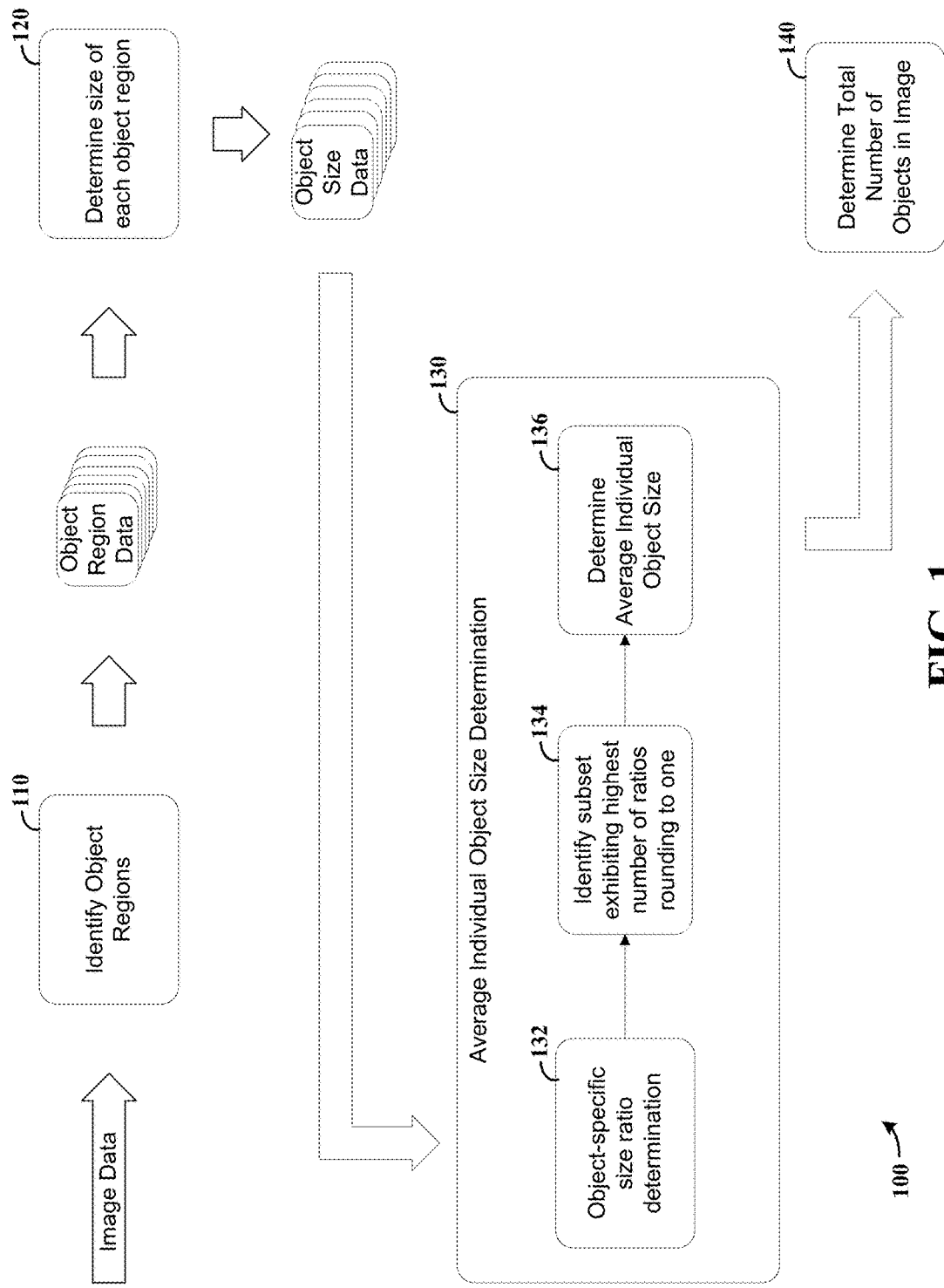
FIG. 1 shows a method and apparatus for characterizing objects, in accordance with an example embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving the characterization of objects. While not necessarily so limited, various aspects may be appreciated through a discussion of examples using this context.

Various example embodiments are directed to automatically characterizing objects from an image, which may include images of individual objects as well as objects grouped in clusters. Certain embodiments are directed to characterizing plant-type objects, such as kernels of corn in which the width and height of each kernel can be determined, or either kernels or ovules on an ear of corn. Other embodiments are directed to characterizing ears of corn. Still other embodiments involve a combination of characterizing kernels of corn and ears from which the kernels are obtained from, such as by characterizing corn ovules or kernels attached to the ears. Various such embodiments may involve characterizing kernels or ovules on an ear of corn, which can be useful in characterizing yield (e.g., by characterizing ovules prior to seeding, and resulting kernel yield for ears that are pollinated and grow kernels). In this context (and in consideration of the above), various embodiments involving the characterization of corn kernels and ovules may be applied to the characterization of a plurality of different types of objects. Further, various embodiments described herein as characterizing kernels may be implemented for characterizing ovules.

In a more particular embodiment involving the characterization of corn, individual kernels and clusters of kernels are imaged and processed in accordance with one or more embodiments herein. This approach may address challenges to manual-based approaches, such as those involving measuring a 100 maize kernel (seed) weight and kernel packing parameters such as kernel depth and width (e.g., along major and minor directions of the kernel), which can be important for understanding maize crop yield. Various implementations employ an algorithm that analyzes images of kernels and returns a total kernel count as well as measurements of kernel width and kernel height as may be provided for each individual kernel.

Various embodiments are directed to non-transitory media having instructions stored thereupon, which cause a computer or other processor-type circuit to carry out various functions as characterized herein, when executed. Such media may, for example, include software stored in a data storage circuit, which may then be transferred to another data storage circuit or media. In some implementations, the instructions are stored on a local device, which receives input image data from remote providers. The local device executes the instructions with the input image data and provides an output or outputs that characterize objects in the image data. This output can be used locally, returned to the remote provider(s) from which the image data is obtained, or otherwise provided for use in characterizing the objects.

In accordance with certain embodiments, object regions are identified in a digital image of a plurality of objects, in which the object regions represent objects or groups of objects in the image, based on differences between the object regions of the image and a background of the image. Such differences may include, for example, shape characteristics such as color or edges in an image. For instance, edge detection approaches may be employed, using mathematical methods for identifying points in digital data representing the image. Such approaches may involve, for example, detecting value-based aspects of the digital data that characterize aspects of the image such as brightness and/or gradients, and used these detected aspects to differentiate object-regions from background. Differences in values can thus represent brightness changes. One such approach involves identifying edges or lines as changes in image brightness in data representing portions of the image, and identifying the edges or lines as object regions. For general information regarding edge detection, and for specific information regarding edge detection approaches that may be implemented in connection with one or more embodiments herein, reference may be made to PCT Patent Publication No. WO2007044828, which is fully incorporated herein by reference.

A size of each object-region is determined and used to determine an average individual size of the objects (e.g., area or perimeter) as follows. For each object-region, ratios of the size of the object-region to the size of each of the other object regions is determined and, therefrom, a total number of the ratios that round to one. A subset of the object regions having a highest total number of the ratios that round to one, relative to the other object regions, is identified. For instance, with objects having a generally consistent size, some objects may be clustered into a single object-region, such that certain object regions have two, three or more objects clustered together, whereas other object regions are of a single object. Using a statistical approach, where a highest likelihood is that object regions include only a single object, those object regions having a single object will exhibit the largest collective number of ratios that round to one (i.e., ratios of object-region to object-region in which both object regions have a single object of similar size).

Using the aforementioned information, an expected, or average, individual object size is determined based on the sizes of the object regions in the subset (e.g., via averaging). A total number of objects in the image is determined based on the determined average expected object size and the sizes of the object regions. This approach may, for example, involve determining a total area of all object regions in the image and dividing the total area by the average individual object size, based on the determined average individual object size.

In some embodiments, binary objects containing single objects are obtained as follows. Each (nth) object in an image is treated as if it were a single kernel. The respective areas of the remaining objects are divided by the nth area and rounded. The number of objects which report a single kernel is recorded in a vector M. The mode of vector M, m, is the number of single kernels. The binary objects which give rise to the mode of vector M, m, are considered single kernels. The average area of the single kernels is calculated as A. A divides the area of the binary objects and the number of objects in each cluster is counted by rounding this ratio. This approach can be used, for example, in connection with those approaches discussed herein with regard to identifying a group of objects for an number of N objects that exhibit the most ratios (relative to the other objects) that round to 1.

In some embodiments, less than all of the objects in an image are used to provide an estimate of the total number of objects in the image. For instance, a subset of objects (e.g., from less than half of an entire image) can be evaluated and used to extrapolate over a much larger image, to provide a reasonable estimate of object size. The average individual object size can thus be attributed to an average object size in the sample portion, and the average object size from the sample portion can be used as an estimate of a total average object size for the image and, therein, to calculate an estimation of a total number of objects in the image.

In some implementations, a number of objects can be determined for an entire image while an average size is computed using only a subset as above. This approach facilitates a reduced computational budget, relative to using the entire image to obtain an average object size. Accordingly, the object regions in the sample portion are evaluated to compute an average object area in the sample portion, and that area is used as an estimate of a total average object area for the image. A total area of all object regions in the image is then determined and divided by the average individual object area.

Object regions are identified using a variety of approaches. In some embodiments, the image data is filtered to identify object regions having a size that is greater than a minimum threshold. This approach may, for example, ensure that dirt or other items in the image that are not consistent with the objects to be evaluated are not inadvertently used. In certain embodiments, object regions are filtered by cross section, to ensure that objects having a sufficiently similar area to those objects to be counted but that are differentiable are not included. For example, where generally round or square objects are expected, longer strands in an image (e.g., plant matter or other contaminants) that are not of an expected cross section can be filtered out of any calculation.

In a more particular embodiment, kernels of corn are characterized as the objects in the above discussion, and further characterization is carried out for the ear from which the kernels are obtained. An image of the ear is processed for identifying the ear relative to background image data, and a Fourier transform is applied to an image gradient of the ear (e.g., along an axial direction/length of the ear). A frequency of peaks in the transformed image data is determined and used to estimate a length of each kernel. In some implementations, some or all of the kernels are individually imaged while still on the ear of corn, for determining a size thereof. In some implementations, a Fourier transform is also applied to the image of the ear of corn, and the frequency of peaks in the transformed image data for the ear of corn is used along with the frequency of peaks for the image gradient to estimate the length of each kernel. For instance, a corresponding period of the frequency peaks can be used to estimate the kernel length. In certain implementations, the aforementioned steps are carried out for ears of corn from a common batch. The length of each ovule and number of ovules in the each ear of a first set are determined (before kernel growth), and the length of each kernel and number of kernels in each ear of a second set are determined (after kernel growth). Yield for the batch can thus be based upon the estimated number of ovules and the estimated number of kernels.

In a more particular embodiment, the image of the ear of corn is processed as follows. The image data is thresholded (e.g., via an Otsu threshold) to identify the corn ear relative to the background in the image, and the image is separated into color channels, such as the (four) CMYK channels, RGB channels or a greyscale version thereof. The Fourier transform of the gradient of the one of the color channels (e.g., the Y channel) is calculated along an axial length of the ear, and both positive and negative values of the gradient of the color channel are decomposed with a sliding window Fourier transform. A frequency of a peak amplitude for each sliding widow is determined along with an average peak frequency across sliding windows for both the positive and negative parts of the gradient (channel). The length of each kernel is estimated by plotting a cosine wave having the determined average peak frequency along the length of the ear, and estimating the average kernel length based upon a period T of the cosine wave. For instance, an estimated period signal with the peaks corresponding to the center of mass located at a kernel and the troughs corresponding to valleys between kernels can be used to estimate the kernel size.

A variety of approaches to imaging kernels can be implemented with the embodiments herein. In a particular embodiment, a handful of kernels are weighed and then scattered across the imaging surface of a flatbed document scanner (e.g., at 1200 dots per inch (dpi)). In some implementations, contrast between the maize ears and the background is provided by leaving a lid of the scanner open such that the background is black. Scans are taken and saved (e.g., to a lossless image format).

The number of kernels represented in an image as above (or otherwise obtained) are determined as followed, in accordance with a particular embodiment. Kernels are separated from the background of the image (e.g., black in the example above) such as by using a thresholding technique). For all objects on the image (e.g., which may be greater than a threshold), the area is measured and the results are stored in an area vector A. A matrix N is created from the column area vector A as follows:

$$N = A * A^{o(-1)},$$

where * is the outer product and $A^{o(-1)}$ is the Hadamard inverse.

Vector G, the estimated number of single kernels, is created as follows:

$$G = \text{sum}(\text{round}(N) == 1, 1).$$

The value K, which is the number of kernels on the image which are not touching, is defined as:

$$K = \text{mode}(G).$$

The average area of a single kernel is defined as:

$$V = \text{mean}(A(G == K)).$$

The number of kernels in a cluster of touching kernels is estimated by dividing the area of a cluster by the average area of a single kernel. The total number of kernels is estimated as the sum of the kernels in each cluster and the number of single kernels.

Kernel packing measurements such as kernel width and depth are measured on each single kernel and reported (e.g., in a comma separated value file). The data can be used in a variety of manners, such as by calculating the 100 kernel weight as (W) Weight of kernels on a scanner divided by the number of kernels on the scanner multiplied by 100.

Various embodiments are directed to characterizing corn ovules. The tip of a kernel is preliminarily identified from among points around a contour of the kernel that could be a tip. This may, for example, be carried out using machine vision and line definition, such as characterized herein. For a group (e.g., 50 or 100) of the kernels, the respective estimated tips are used as a baseline and several characteristics of each kernel are computed using the preliminary tips as a baseline set of characteristics to work from. Such characteristics may include, for example, one or more of symmetry about the a putative tip point centroid axis, depth, width, depth:width ratio, curvature for a portion of the base of the corn (e.g., opposite the tip), curvature for portion of an apex of the corn, and overall curvature. The characteristics are then recomputed for additional potential tips of each kernel, and the recomputed characteristics for each potential tip is compared to the baseline characteristics. For any such potential tip that exhibits computed characteristics having a better match to the baseline characteristics than computed characteristics for the preliminarily-identified tips, the potential tip is identified as the new tip. After some or all of the kernels are processed in this context, the baseline characteristics are recomputed using any newly-identified potential tips exhibiting the better match. The above steps can then be carried out with the recomputed baseline characteristics, and the process can be repeated. It has been discovered/recognized that repeating the process twice can be adequate as the identified tip points are unlikely to change after two iterations.

In a more specific embodiment, the objects include corn kernels the expected individual object size is determined as follows. A point of maximum contour curvature of each kernel is determined, as is a centroid of each kernel. Features characterizing each kernel are computed, and an n-dimensional distribution of the features is generated. For each kernel, the features are calculated for respective contour points on the kernel, using each contour point as a putative tip point. The calculated features for each contour point are compared with the n-dimensional distribution, and the probability of each contour point being a true tip of the kernel is assessed based on the calculated features for both the contour point and the n-dimensional distribution. For those contour point exhibiting a probability that matches a peak of the n-dimensional distribution better than the determined point of maximum contour curvature for the kernel, the n-dimensional distribution is updated using the calculated feature data for the contour point. The steps of calculating, comparing and assessing are repeated for each kernel.

Various approaches to identifying a desirable selection are implemented in accordance with the following algorithm, in accordance with one or more embodiments.
1) Initialize an algorithm with choices or options.
2) Measure features of each selected and unselected choices or options (e.g., measure object features).
3) Create a probability distribution of features for those choices or options chosen.
4) Obtain a probability of each choice or option being chosen based on its features.
5) Obtain a new choices or options based on more probable choices or options.
6) If the new choices are the same as initialized or previous choices, then stop.
7) If the new choices are different than the initialized or previous choices, initialize the algorithm with the new choices and repeat the above steps beginning at step 3.

Such approaches may, for example, be used in selecting objects such as corn kernels, and may be implemented with one or more embodiments herein.

In a particular embodiment, the above algorithm is implemented for making decisions based on experience. For example, a corn breeder might walk a field containing 1000 newly created inbred lines and be expected to choose a set that should be tested for yield, or a person might select a product from many other products but not fully appreciate why the product choice was made. The aforementioned approach can be implemented for making and automating such decisions.

In accordance with a more particular embodiment, ears of corn are characterized as follows. Image data including an image of the ear of corn is processed and a portion of the image data that includes the corn ear is identified, relative to a portion of the image data corresponding to a background of the image. For instance, two or more ears may be placed on a scanner bed and imaged accordingly, with background information being removed. A Fourier transform is applied to an image gradient of the portion of the image data including the ear of corn, and transformed image data is provided therefrom. A frequency of peaks is identified for the transformed image data, and a length of each kernel in the ear of corn is estimated based on the determined peak frequency. These approaches can be implemented to extract information about the shape of kernels packed along the ear, max ear width, ear width along the major axis of the ear and ear length. In certain implementations, the kernels are removed from the ear and the bare cob is scanned, with width and length measured again by similar image analysis, which can be used in further characterizing the kernels that were removed (relative to scanning with the kernels in place on the cob).

In a more particular implementation, the image data from the image of the ear of corn is thresholded for identifying the ear relative to the background, and the Fourier transform is applied to a gradient of a color channel from separated color channels of the image data, along an axial length of the ear. Positive and negative values of the gradient of the color channel are separately decomposed with a sliding window Fourier transform (e.g., 1200 and 1600 pixels for a Y color channel). A frequency of a peak amplitude for each sliding widow is then determined, and an average peak frequency across sliding windows for both the positive and negative parts of the gradient is then determined. The length of each kernel on the ear is estimated by plotting a cosine wave having the determined average peak frequency along the length of the ear, and estimating the average kernel length based upon a period T of the cosine wave.

In some embodiments, the ears are scanned two-dimensionally, rotated, and scanned one or more additional times. This approach facilitates the analysis of kernels on the ear from two or more perspectives, and the results can be combined. Furthermore, the kernels may be subsequently removed from the ears and imaged separately, using techniques as above for estimating average size and weight of the kernels on the ear.

Characteristics of the ears can be obtained in a variety of manners. In some implementations, maximum ear length and width are determined by the size of a bounding box which encompasses the ear. The width along the length of the ear is measured by integrating the thresholded ear image along the width of the ear and dividing by two. The average ear width is taken over the length of the ear. This approach can thus facilitate high throughput measurements of kernel loading on an ear of corn and ear size, providing valuable data for consistent yield measurements.

Turning now to the figures, FIG. 1 shows a method and apparatus for characterizing objects, in accordance with another example embodiment. Each of the blocks as shown may be carried out in method-based embodiments, or as blocks of an apparatus (e.g., programmed computer) or of an algorithm executed by a processor based on instructions stored on a non-transitory medium. At block 110, image data for an image of a plurality of objects (e.g., as obtained from a scanner or other imaging device) is received and processed for identifying object regions that represent objects or groups of objects in the image, based on differences between the object regions of the image and a background of the image. This object region data is then processed at block 120 at which a size of each object-region is determined, and the determined sizes are provided for determining an average individual object size for the objects at block 130.

At block 132, object-specific size ratios are determined for each object region, relative to the size of each of the other object regions, and a total number of the ratios for each object region that round to one is determined. At block 134, a subset of the object regions having a highest total number of the ratios that round to one, relative to the other object regions, is identified. In some implementations, this subset is identified as a subset of regions having a single object, based on a probability that the largest group of object regions will include only a single object. At block 136, the average individual object size in the image is determined by averaging the sizes of the object regions in the subset. This average individual object size is provided to block 140, at which a total number of the objects in the image is determined based on the determined average individual object size and sizes of the object regions.

Figure 2:
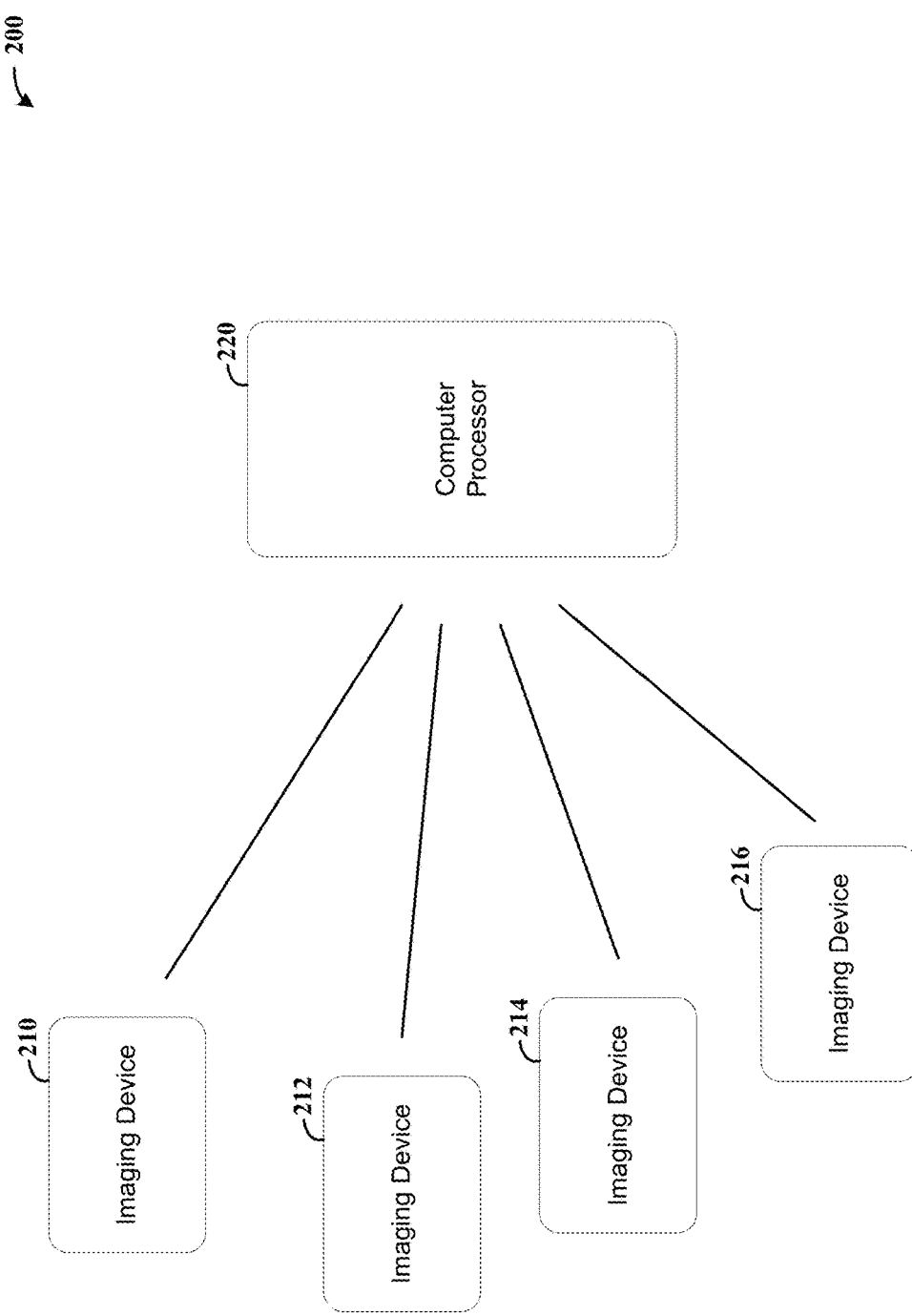
FIG. 2 shows a system for characterizing objects, in accordance with another example embodiment.

FIG. 2 shows a system 200 for characterizing objects, in accordance with another example embodiment. The system includes an imaging device 210 (e.g., a scanner or camera) and a computer processor 220 that is coupled to receive digital image data from the imaging device 210. The computer processor 220 is configured/programmed to carry out processing steps in accordance with one or more embodiments herein, such as those shown in FIG. 1 for determining an average object size of objects in the image. In some embodiments, the system 200 includes multiple imaging devices, also including 212, 214 and 216 (or more), and operates to receive the image data remotely from each device, to process the data and return a result indicative of the average object size and/or other information, such as total number of objects.

Figure 3:
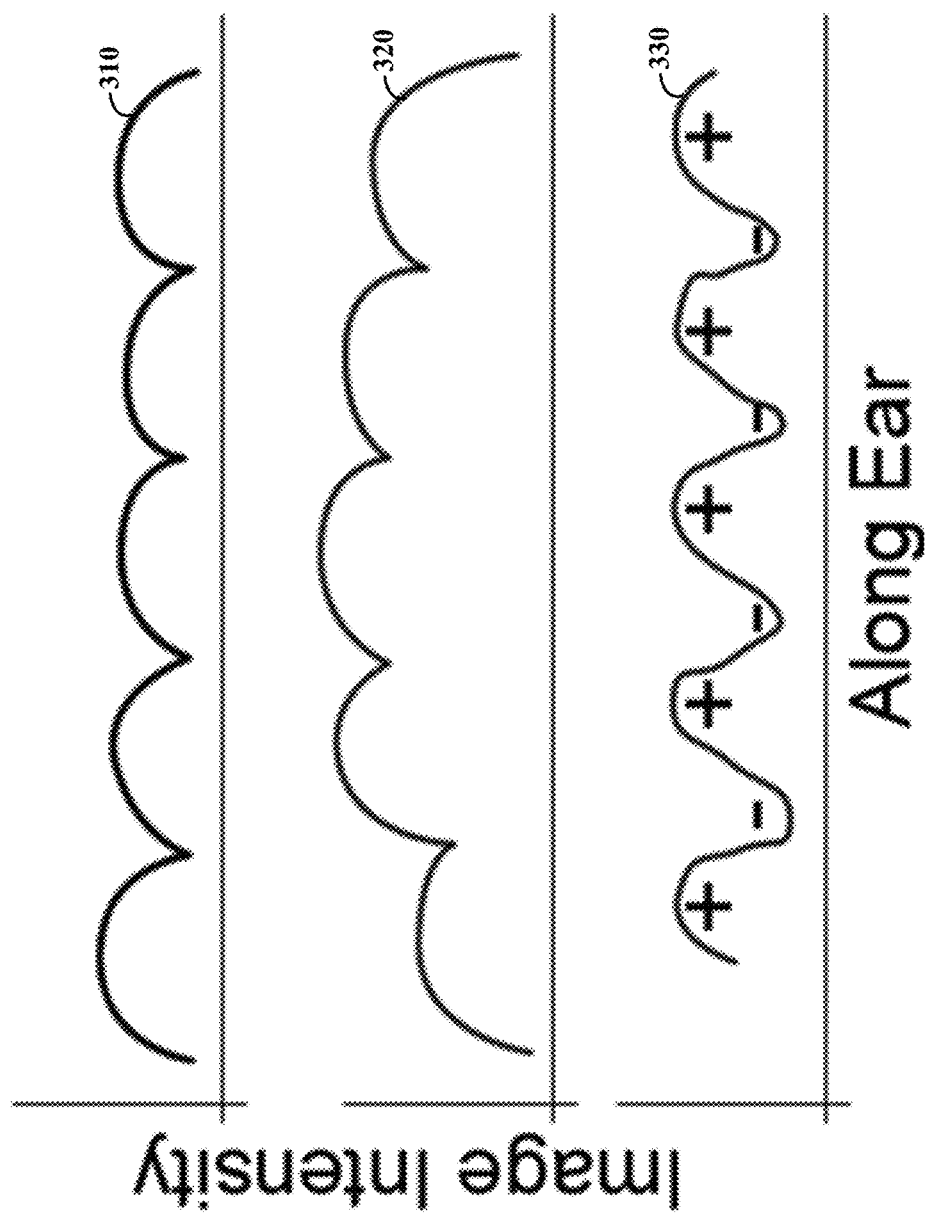
FIG. 3 shows plots of profile characteristics of a gray scale image along an ear of corn, in accordance with another example embodiment.

FIG. 3 shows plots of profile characteristics of a gray scale image along an ear of corn, in accordance with another example embodiment. At 310, an example profile is shown, and the example profile with a low frequency signal imposed thereupon is shown at 320. The lobs correspond to kernels, and the troughs correspond to the valley between kernels. With the ideal model, one could use a Fast Fourier Transform (FFT), select the major frequency, and use the period to approximate the kernel length along the ear. However, the low frequency tones superimposed on the example profile (in an actual measurement) can complicate a FFT analysis and are accounted for by taking a gradient of the signal and separately analyzing the positive and negative parts of the signal with a FFT. The gradient of the signal serves to dampen the low frequency noise relative to the slightly higher kernel signal. The positive and negative halves of the signal are separately analyzed to maintain the proper periodicity. The peak frequencies of the positive and negative halves of the signal are averaged together to obtain the average frequency for a given window, with results as shown at 330.

Figure 4:
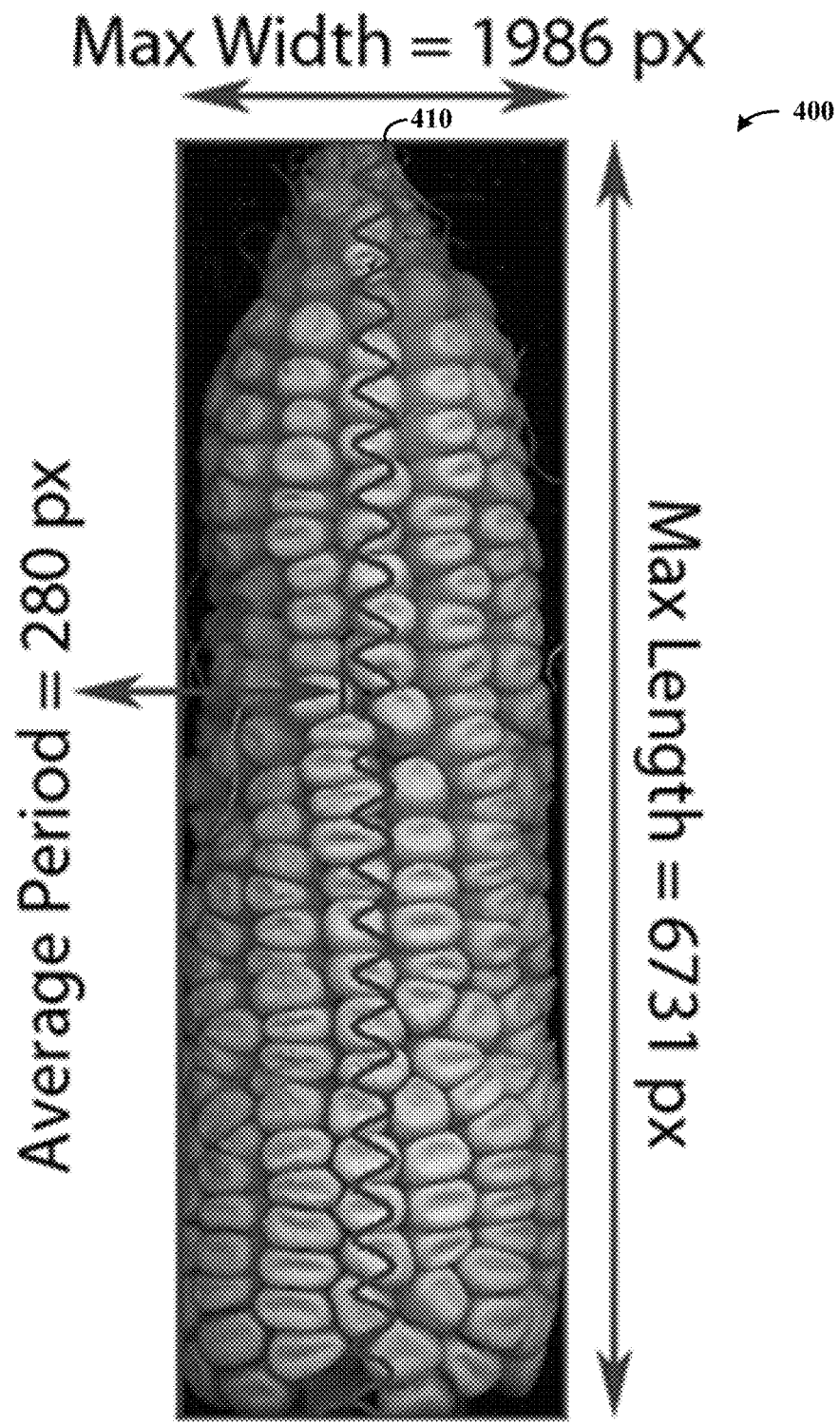
FIG. 4 shows an ear of corn with a resulting profile as shown in FIG. 3, superimposed on the ear of corn (from which the profile is obtained), in accordance with another example embodiment.

FIG. 4 shows an ear of corn 400 with a resulting profile 410 as shown in FIG. 3, superimposed on the ear of corn (from which the profile is obtained). For this example, the max ear width is 1986 pixels, the ear length is 6731 pixels and the average kernel length is 280 pixels. The width and length are found from the bounding box encapsulating the ear and the kernel length is approximated from the average period found from the sliding windows.

Figure 5:
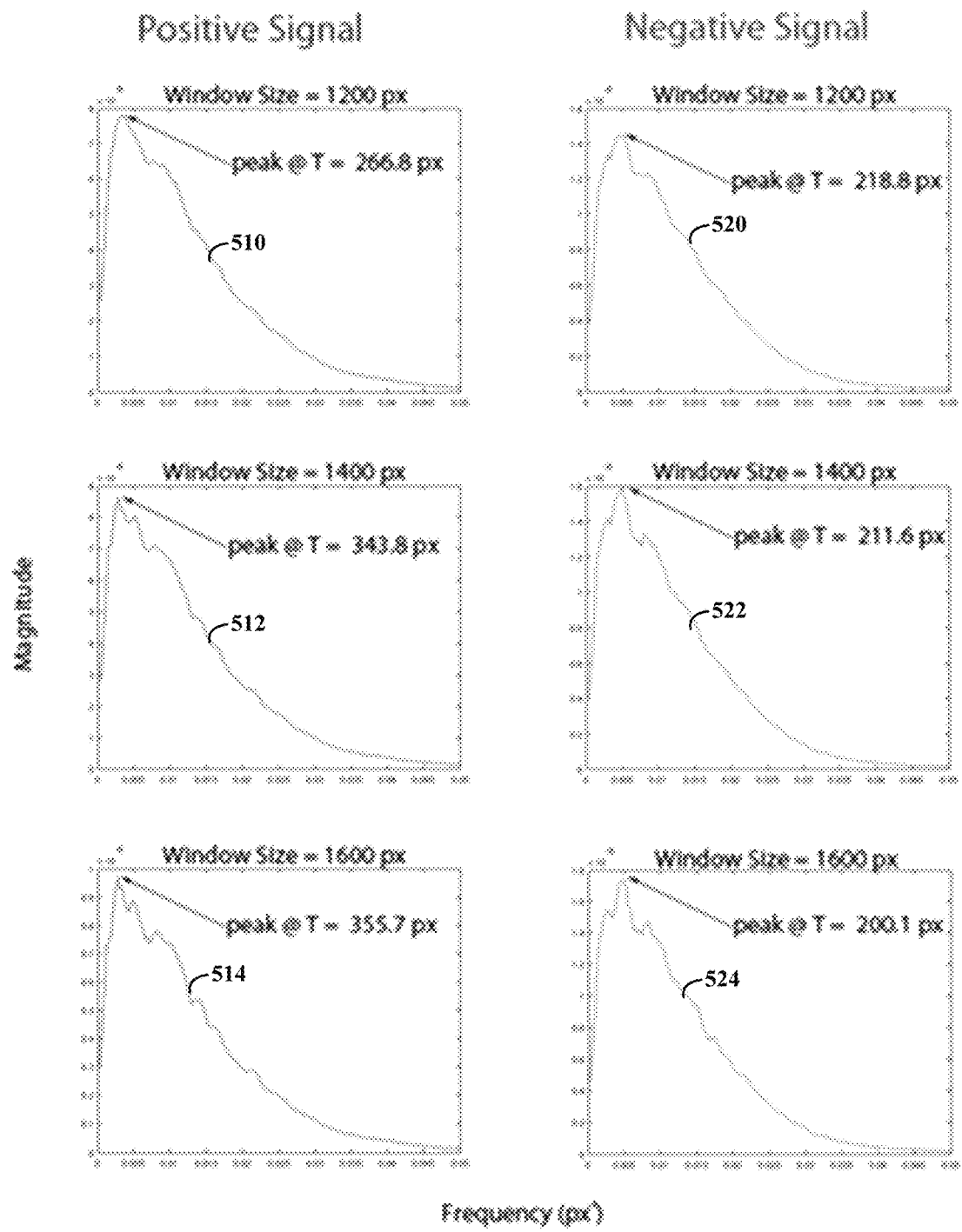
FIG. 5 shows an approach involving six sliding window FFT transformations with an image of an ear of corn, in accordance with another example embodiment.

FIG. 5 shows an approach involving six sliding window FFT transformations with an image of an ear of corn. The positive (left) and negative (right) parts of the vertical image gradient are separately analyzed and the results of all the sliding windows are averaged together to create an approximation of the kernel length. The positive parts are represented in plots 510, 512 and 514 for 1200, 1400 and 1600 pixels, respectively. The negative parts are represented in plots 520, 522 and 524, also for 1200, 1400 and 1600 pixels, respectively. For the example ear presented here, the average period is 280 pixels, or 6 cm.

The following embodiments may be implemented in connection with or in a similar manner as one or more of the above-discussed embodiments, in an experimental or other context. In one embodiment, four flatbed scanners are placed on a table with two scanners on each side of the table and an ear sheller is placed between each pair of flatbed scanners. Maize ears enter the workflow at the head of the table, where three ears of a single genotype are placed on a flatbed scanner. 24 bit RGB (red, green blue) images are taken at 1200 dpi and the genotype is recorded in a spreadsheet. The ears are passed through a sheller and kernels are collected. Images of the cobs are collected at 24 bit RGB with 1200 dpi and are saved for further measurements. Approximately 100 kernels are placed on a flatbed scanner and again RGB images are acquired at 24 bit and 1200 dpi. In total, a single genotype has three ears that produce two images of three ears, one image of three cobs and one image of pooled kernels.

Each RGB ear image contains three ears on a black background. First, each RGB image is converted into a gray scale image and smoothed with a Gaussian kernel to blend out high frequency noise such as dust, scratches and silk from the background. Otsu's threshold method is applied to obtain a global threshold value for the image and a binary mask is obtained. Small binary objects are removed which are smaller than X pixels in size and holes within the image are filled. A bounding surrounding the mask is created and the ear length and width are found by measuring the length and width of the bounding box.

The measured kernel length along the ear is one measurement of kernel size that affects test weight and kernel packing along the ear. The Fourier transform is a signal processing method that measures the amplitude and phase information needed to reconstruct a periodic signal.

Approximately 100 kernels are weighed, placed on a 6×6 inch area of the flatbed scanner and 24-bit RGB images are taken at 1200 dpi. The lid of the flatbed scanner is left open to provide a black background. The images are converted to gray scale, smoothed with a Gaussian kernel (sigma=X) and Otsu's threshold method is applied to obtain a binary mask for clusters of kernels. The area of each binary object is obtained and stored in a set $A_k$ where k indexes the $k^{th}$ cluster. The set $M_{ij}$ is created by rounding the ratio of the $i^{th}$ object by the $j^{th}$ object (Equation 1).

$$M_{ij} = \left[\frac{A_i}{A_j}\right] \quad \text{Equ (1)}$$

Subsequently the set $N_j$ is obtained by counting the number of objects that round to one for the $j^{th}$ object (Equation 2).

$$N_j = |\{x \in M_{ij} | M_{ij}=1\}| \quad \text{Equ (2)}$$

The mode of the set $N_j$ is considered to be the number of single kernels in the image. The areas of single-kernel clusters are averaged together to obtain the average area of a single kernel, $\tilde{A}$. The total kernels, T, in the image are obtained by summing the rounded ratio of the area set $A_k$ by the average area, $\tilde{A}$.

$$T = \sum_i \left[\frac{A_i}{\tilde{A}}\right]$$

For each single-kernel cluster, the major and minor axis is measured along with the area.

After the kernels are removed from the ear the three cobs are placed on the flatbed scanner and scanned at 1200 dpi. To obtain an image that can easily be segmented, the cobs are scanned with a neon green background. The RGB images are transformed to HSV (hue, saturation, value (brightness)) color space, a Gaussian Filter is applied and Otsu's threshold method is used on the hue channel to isolate the cobs from the background. As with the ear images, a bounding box is drawn around each cob and the length and width of the bounding box directly measures the width and length of the cob. For general information regarding Otsu's threshold, and for specific information regarding the implementation of Otsu's threshold in accordance with one or more embodiments herein, reference may be made to Otsu, N, "A Threshold Selection Method from Gray-Level Histograms," *Systems, Man and Cybernetics, IEEE Transactions on* 1979, 9:62-66, which is fully incorporated herein by reference.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., thresholding, Fourier transforming, or averaging). For example, in certain of the above-discussed embodiments, one or more modules are discrete logic circuits, computer processor circuits or programmable logic circuits configured and arranged for implementing these operations/activities, as in the circuit modules shown in FIG. 2. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, various embodiments involve characterizing only kernels of corn, other embodiments involve characterizing only ears of corn, and some embodiments involve characterizing both ears and kernels, in accordance with embodiments herein. Still other embodiments involve the characterization of other agricultural products, and of object that are not agricultural in nature. Further, other manners to separate background information from image data, to estimate sizes, or to average sizes and relate those sizes to an overall group or ear can be made to effect similar function. Reference to dimensions such as "height" and "length" may be interpreted as either height or length, or other dimensional components to suit particular applications and related orientation. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. A method comprising:
  processing first image data for an image of a plurality of objects, and identifying therefrom object regions in the first image data, at least one of the object regions including a cluster of at least two of the plurality of objects, based on value differences between data characterizing the object-regions and data characterizing a background region of the image;
  determining a size, including an area or perimeter-based dimension, of each object-region;
  determining an individual object size for the plurality of objects by
    for each object-region, determining respective ratios of the size of the object-region to the size of each of the other object regions,
    identifying ones of the object regions having a higher total number of the ratios that round to one, relative to the other object regions, and
    determining an expected individual object size based on the sizes of the identified ones of the object regions; and
  determining a total number of the objects in the image based on the determined expected individual object size and the sizes of the object regions, by using the determined expected individual object size and the size of each object region to detect a number of objects within each object region.

2. The method of claim 1, wherein
  identifying the ones of the object regions having a higher total number of the ratios that round to one, relative to the other object regions, includes identifying said ones of the object regions as individual objects and identifying said other object regions as including clusters of the objects, determining the expected individual object size includes determining an average individual object size, by averaging the sizes of the identified ones of the object regions, and determining the total number of the objects in the image includes determining a total area of all object regions in the image and dividing the total area by the average individual object size, based on the determined average individual object size.

3. The method of claim 1, wherein determining respective ratios of the size of the object-region to the size of each of the other object regions includes, for each object-region, respectively dividing the determined size of the object-region by the size of each of the other object regions to provide a plurality of ratios of the object-region to each of the other object regions.

4. The method of claim 1, wherein
identifying the object regions includes identifying object regions in a sample portion of the image that is less than half of the image, the expected individual object size being an average object size in the sample portion, and
determining the total number of the objects in the image includes using the average object size from the sample portion as an estimate of a total expected object size for the image.

5. The method of claim 1, wherein
determining a size of each object-region includes determining the area of each object region, and determining the expected individual object size for the plurality of objects includes determining the average individual object area by
identifying the object regions in a sample portion of the image that is less than half of the image, the average individual object area being an average object area in the sample portion, and
determining the total number of the objects in the image includes, using the average object area from the sample portion as an estimate of a total average object area for the image, determining a total area of all object regions in the image and dividing the total area by the average individual object area.

6. The method of claim 1, wherein identifying the object regions includes filtering the first image data by identifying the object regions as object regions having a size that is greater than a minimum threshold.

7. The method of claim 1, wherein identifying the object regions includes filtering the first image data by identifying the object regions as object regions having a shape within a cross-sectional threshold.

8. A method comprising:
processing first image data for an image of a plurality of objects that include at least one of corn ovules and corn kernels, and identifying therefrom object regions in the first image data that represent objects or groups of objects in the image based on value differences between data characterizing the objects and data characterizing a background region of the image;
determining a size, including an area or perimeter-based dimension, of each object-region;
determining an individual object size for the plurality of objects by
for each object-region, determining respective ratios of the size of the object-region to the size of each of the other object regions,
identifying ones of the object regions having a higher total number of the ratios that round to one, relative to the other object regions, and
determining an expected individual object size based on the sizes of the identified ones of the object regions;
determining a total number of the objects in the image based on the determined expected individual object size and the sizes of the object regions;
processing second image data from an image of a corn ear, and identifying therefrom a portion of the second image data including the corn ear relative to a portion of the second image data corresponding to a background of the image;
applying a Fourier transform to an image gradient of the portion of the second image data including the corn ear, and providing transformed image data therefrom;
determining a frequency of peaks in the transformed image data; and
estimating a length of each ovule or kernel based on the determined peak frequency.

9. The method of claim 8, wherein the image of the plurality of objects includes images of kernels of corn while they are attached to the corn ear.

10. The method of claim 8, wherein the image gradient is a gradient along an axial direction of the corn ear.

11. The method of claim 8, further including applying a Fourier transform to the image of the corn ear, wherein the determining the frequency of peaks in the transformed image data includes determining a frequency of peaks in the transformed image data for the corn ear and for the image gradient.

12. The method of claim 8, wherein estimating the length of each ovule or kernel based on the determined peak frequency includes using a corresponding period of the frequency peaks to estimate the length of each ovule or kernel.

13. The method of claim 8, wherein
processing the second image data from the image of the corn ear includes thresholding the image data, and wherein identifying the portion of the second image data including the corn ear includes using the thresholded image data,
applying the Fourier transform includes separating the second image data into color channels and calculating the Fourier transform of a gradient channel within the color channels along an axial length of the ear,
determining the frequency of the peaks includes separately decomposing positive and negative values of the gradient of the one of the color channels with a sliding window Fourier transform, determining a frequency of a peak amplitude for each sliding window, and determining an average peak frequency across sliding windows for both the positive and negative parts of the gradient, and
estimating the length of each ovule or kernel includes plotting a cosine wave having the determined average peak frequency along the length of the ear, and estimating an average length of the kernels based upon a period T of the cosine wave.

14. The method of claim 8, wherein the image of the plurality of objects includes images of corn ovules on the corn ear.

15. The method of claim 1, wherein the plurality of objects include corn kernels, and wherein determining the expected individual object size for the plurality of objects includes:

determining a point of maximum contour curvature of each kernel;
determine a centroid of each kernel;
computing a plurality of features characterizing each kernel;
creating an n-dimensional distribution of the plurality of features;
for each kernel,
calculating the plurality of features for respective contour points on the kernel, using each contour point as a putative tip point,
comparing the calculated features at each contour point with the n-dimensional distribution, and
assessing the probability of each contour point being a true tip of the kernel based on the calculated features for the contour point and the n-dimensional distribution,
for each contour point exhibiting a probability that matches a peak of the n-dimensional distribution better than the determined point of maximum contour curvature for the kernel, updating the n-dimensional distribution of the plurality of features using the contour point; and
repeating the steps of calculating, comparing and assessing for each kernel.

16. The method of claim 15, wherein computing the plurality of features includes computing a plurality of features selected from the group consisting of putative tip point-centroid axis, depth, width, depth:width ratio, curvature for a portion of a base of the kernel, curvature for a portion of the apex of the kernel, and overall curvature of the kernel.

17. A non-transitory computer-readable medium having instructions stored thereupon that, when executed by a computer processor, cause the computer processor to: process first image data from an image of a plurality of objects, and identify therefrom object regions in the first image data that represent objects or groups of objects in the image, at least one of the object regions including a cluster of at least two of the plurality of objects, based on value differences between data characterizing the object regions of the image and data characterizing a background of the image; determine a size, including an area or perimeter-based dimension, of each object-region; determine an average individual object size for the plurality of objects by for each object-region, determine respective ratios of the size of the object-region to the size of each of the other object regions, identify a subset of the object regions, in which the object regions have a higher total number of the ratios that round to one relative to the other object regions, and determine an expected individual object size based on the sizes of the object regions in the subset; and determine a total number of the objects in the image based on the determined expected individual object size and the sizes of the object regions, by using the determined expected individual object size and the size of each object region to detect a number of objects within each object region.

18. The non-transitory computer-readable medium of claim 17, wherein the instructions, when executed by the computer processor, cause the computer processor to determine a total number of the objects in the image by determining a total area of all object regions in the image and dividing the total area by the expected individual object size, based on the determined expected individual object size.

19. The non-transitory computer-readable medium of claim 17, wherein the size of the object regions is one of an area of the object regions or a perimeter of the object regions, and wherein the subset of the object regions are identified as individual objects, and said other object regions are identified as including clusters of the objects.

20. The non-transitory computer-readable medium of claim 17, wherein the instructions, when executed by the computer processor, cause the computer processor to
identify the object regions by identifying object regions in a sample portion of the image that is less than the entire image, the expected individual object size being an average object size in the sample portion, and
determine the total number of the objects in the image by using the average object size from the sample portion as an estimate of a total average object size for the image.

21. The non-transitory computer-readable medium of claim 17, wherein the objects are kernels from a corn ear and the instructions, when executed by the computer processor, cause the computer processor to
process second image data from an image of the corn ear, and identify therefrom a portion of the second image data including the corn ear relative to a portion of the second image data corresponding to a background of the image;
apply a Fourier transform to an image gradient of the portion of the second image data including the corn ear, and provide transformed image data therefrom;
determine a frequency of peaks in the transformed image data; and
estimate a length of each kernel based on the determined peak frequency.

22. The non-transitory computer-readable medium of claim 21, wherein the instructions, when executed by the computer processor, cause the computer processor to
process the second image data from the image of the corn ear by thresholding the image data, and to identify the portion of the second image data including the corn ear by using the thresholded image data,
apply the Fourier transform by separating the second image data into color channels and calculating the Fourier transform of the gradient of one of the color channels along an axial length of the ear,
determine the frequency of the peaks by separately decomposing positive and negative values of the gradient of the one of the color channels with a sliding window Fourier transform, determining a frequency of a peak amplitude for each sliding window, and determining an average peak frequency across sliding windows for both the positive and negative parts of the gradient, and
estimate the length of each kernel by plotting a cosine wave having the determined average peak frequency along the length of the ear, and estimating the average kernel length based upon a period T of the cosine wave.

23. An apparatus comprising: an imaging device configured and arranged to capture an image of a plurality of objects; and a computer processor circuit configured and arranged with stored instructions to: process first image data from an image of a plurality of objects, and identify therefrom object regions in the first image data that represent objects or groups of objects in the image, at least one of the object regions including a cluster of at least two of the plurality of objects, based on differences between the object regions of the image and a background of the image; determine a size, including an area or perimeter-based dimension, of each object-region; determine an expected individual object size for the plurality of objects by for each object-region, determining respective ratios of the size of the object-region to the size of each of the other object regions, identifying ones of the object regions having a higher total number of the ratios that round to one, relative to the other object regions, and determining the average individual object size by averaging the sizes of the ones of the object regions; and determine a total number of the objects in the image based on the determined average individual object size and the sizes of the object regions, by using the determined expected individual object size and the size of each object region to detect a number of objects within each object region.

24. The apparatus of claim 23, wherein identifying said ones of the object regions includes differentiating clusters of the objects from individual ones of the objects by identifying the individual objects as ones of the object regions having a higher total number of the ratios that round to one, relative to the other object regions, and identifying the other regions as including clusters of the objects.

\* \* \* \* \*